April 14, 1959     E. J. POLTORAK ET AL     2,882,082
GASKETS
Filed July 2, 1954
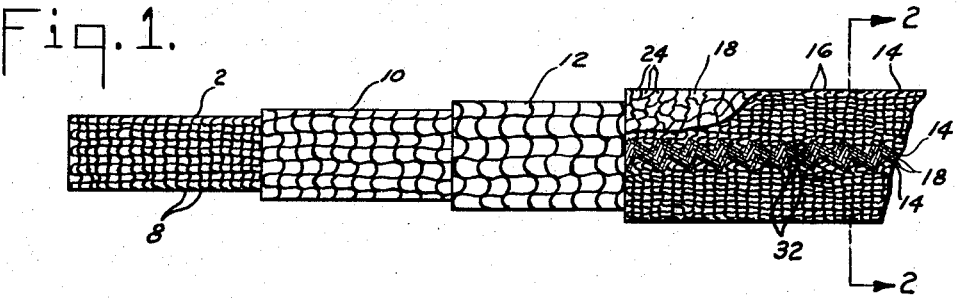
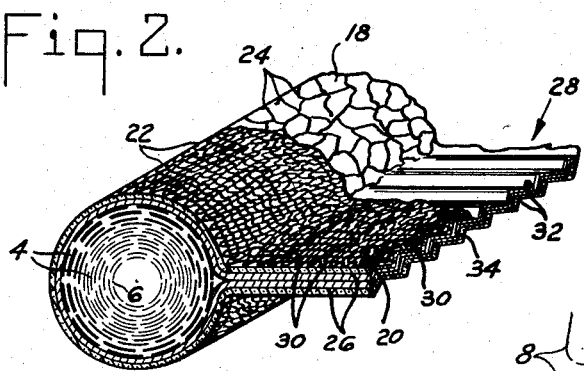
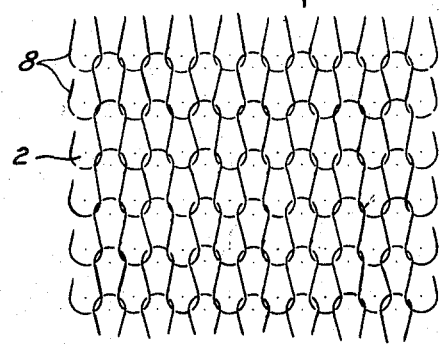
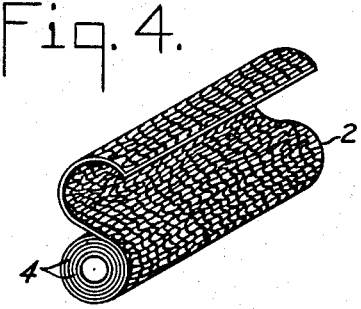
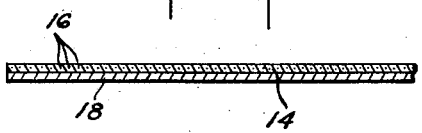
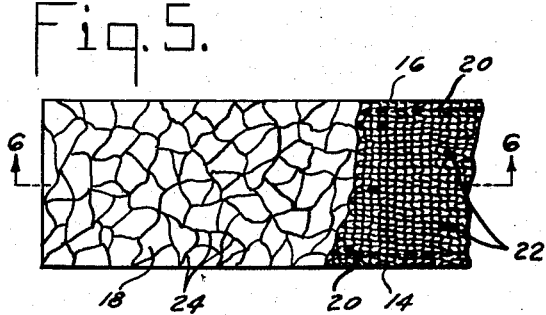
INVENTORS,
EMIL J. POLTORAK
DONALD H. JOHNS
BY
ATTORNEY

United States Patent Office 2,882,082
Patented Apr. 14, 1959

2,882,082

GASKETS

Emil J. Poltorak, Somerville, N.J., and Donald H. Johns, Kirkwood, Mo., assignors to Johns-Manville Corporation, New York, N.Y., a corporation of New York Application July 2, 1954, Serial No. 441,014

10 Claims. (Cl. 288—11)

This invention relates to gaskets, and in particular to improvements in gaskets for high temperature service, especially such gaskets having a shape as generally illustrated in E. J. Wirfs U.S. Patent No. 1,533,490, issued April 14, 1925.

Various attempts have been made to develop gaskets having the properties requisite for high temperature service and resistance to corrosion by fluids including gases, but known gaskets for this purpose have not generally exhibited the desired combined properties of ready compressibility under light sealing forces, good sealing effectiveness, over a long service life, flexibility, and good resilience or tendency to recover from compression loads. In U.S. patent application Serial No. 438,997, filed June 24, 1954, in the name of Emil J. Poltorak and Walter M. DeWitt, Sr., there is disclosed a gasket which exhibits these desired properties, and which will withstand relatively high temperatures in service. It is desirable, however, to provide such a gasket which is corrosion-resistant, and having the ability to withstand extremely high temperatures over a long service life without having their sealing properties materially affected, for instance, temperatures in the neighborhood of 2000° F. and above, such as encountered in installations in the firewalls of jet engine aircraft.

Accordingly, it is an object of the instant invention to provide a gasket which is readily compressed, which seals effectively, which is flexible and able to follow the relative motion of the surfaces to be sealed, which at the same time has a high degree of resilience, and, if desired, can be formed of materials which will withstand extremely high temperatures over a long service life without material loss of its sealing effectiveness.

Broadly, our invention comprises gasketing having a resilient, flexible, compressible core, preferably a core formed in the manner described in the said pending application Serial No. 438,997, in which a strip of fabric knitted from metallic strands is rolled laterally, in relatively loose fashion, into superposed convolutions to form a center, about which is applied a jacket comprising one or more layers of fabric also knitted from metallic strands. About such a core, we apply a cover comprising an inner layer of metal foil and one or more outer layers of fabric knitted from metallic strands. In more particular aspects, the invention comprises the use of metallic strands in the knitted metal mesh components having initial diameters falling within certain size ranges, and knitted so that the several metal mesh components have each a number of courses per inch falling within a certain range. The invention comprises also the use of a metallic foil of a thickness falling within a certain range, which, in combination with the particular metal mesh components, provides the flexibility and other specified desirable properties of the complete gasket. The combination of the particular core and cover produces the desired results enumerated above in a manner pointed out in greater detail hereinafter.

The nature of the invention, and other objects thereof, and the manner of accomplishing the various objects, will be more clearly understood from the following detailed description, taken in connection with the accompanying drawing, in which:

Fig. 1 is a view in elevation showing a portion of a novel gasket, with certain elements broken away in part and with others shown in section;

Fig. 2 is a perspective view of the gasket of Fig. 1, taken on the section line 2—2 and looking in the direction of the arrows, but showing the core elements schematically;

Fig. 3 is a detail plan view on an enlarged scale, illustrating a knitted metal mesh fabric such as employed in the core and cover;

Fig. 4 is a perspective view showing how such a knitted metal mesh fabric may be rolled upon itself to form the center, the convolutions being shown schematically;

Fig. 5 is a plan view of the cover material illustrated in Fig. 1, with certain layers thereof broken away in part; and, Fig. 6 is a sectional view taken on the line 6—6, showing the layers of material comprising the cover illustrated in Fig. 5.

In accordance with the invention, a resilient, flexible, compressible gasket core is fashioned, preferably from all metallic components. In the highly preferred embodiment of the invention, the core is made in a manner disclosed in the said copending application Serial No. 438,997. In forming such a core, a strip of knitted metal mesh fabric 2, of suitable width, depending upon the diameter of the gasket core to be formed, is rolled laterally into superposed convolutions 4 to form a center 6 for the gasket core. The strip of fabric knitted from metallic strands may be cut from a tubular knitted metal mesh stocking, as produced by conventional knitting machinery employed in the metal textile industry, the stocking being flattened, so that the strip as employed desirably, but not necessarily, comprises two layers of the fabric. It is preferable to crimp the strip before rolling it into the convoluted form. Very effective results are obtained by crimping the fabric strip lightly diagonally thereof, in a manner difficult to show, but intended to be illustrated by the wavy lines depicting certain of the strands of the fabric 2 in Fig. 1, and by not rolling the strip too tightly, so that the convolutions are relatively loosely related, with at least some of the crimps of successive convolutions interlocking. If desired, the central opening of the center 6 of the described construction may be filled by rolling within it one or more such centers, or by using a wider center strip and additional convolutions thereof, with the result, however, that a certain amount of the highly desired ready initial compressibility is thereby sacrificed.

The metallic strands 8 employed in the fabric 2 are preferably knitted about 8–20 courses per inch, and have an initial diameter within the range of about .003–.008 inch. The terminology, "initial diameter," is used in this application as an inclusive term to identify not only strands having a circular cross-section, but also strands having initially a circular cross-section but which may have been flattened or otherwise distorted in cross-sectional shape as employed in the various components of the gaskets.

Surrounding the center formed as described above, is a jacket comprising at least one layer of fabric knitted from metallic strands. Conveniently, the jacket comprises a tubular knittted metallic mesh stocking as shown at 10 having its inner surface in contact with the center and holding it under relatively light compression in its convoluted form. Preferably, a plurality of such jackets are applied, one over the other and in relatively light compressive contact with each other. One such additional jacket is illustrated at 12. For successful results, the strands employed in the jacket or jackets should be knitted bout 4–12 courses per inch, and should have an initial diameter within the range of about .004–.020 inch. Effective results have been obtained by employing somewhat coarser strands and a more open knit in the outer jacket 12 than in the inner jacket 10 as illustrated, but this is not necessary, so long as the stated ranges of strand size and number of courses per inch are satisfied. In general, it is preferred that the jackets 10, 12, in a given gasket, be knitted from heavier gauge wire, and with a coarser mesh, than the fabric 2 forming the center strip 6.

As shown particularly in Figs. 5 and 6, the cover of the gasket of the instant invention comprises at least one layer of fabric 14 knitted from metallic strands 16, about 7–18 courses per inch, having an initial diameter within the range of about .003–.010 inch. This fabric may conveniently be formed by cutting a strip from a flattened, tubular, knitted metal mesh stocking, as produced by conventional knitting machinery employed in the metal textile industry, so that the metal mesh is present in two layers, or a single layer is sufficient, particularly where the heavier gauge of wire is employed. The cover comprises further a layer of flexible metallic foil 18 having a thickness within the range of about .001–.015 inch. The knitted metal mesh 14 is placed face-to-face with the metal foil 18 and is secured thereto, preferably by continuous welding adjacent the edges of the mesh, as indicated by the dash lines 20, and by spot welding at a plurality of spaced points intermediate thereof, as indicated by the dots 22. After securing the mesh to the foil, it is highly desirable to pass the resulting laminated material through a two-roll calender, using a rubberized fabric as a cushion, or otherwise to subject it to compressive force to impress the configuration of the strands of the knitted fabric into the foil, thus forming indentations in the foil, as indicated at 24, to increase its flexibility. The indentations in the foil could be made otherwise, for instance, by subjecting it before assembly with the metal mesh fabric to the action of a compression member having projections thereon of such a nature, and arranged in such a manner, as to produce the desired pattern.

A cover formed as indicated above from strips of foil and knitted metallic mesh fabric having a width to be determined by the size and shape of the complete gasket is fitted around the core with the layer of foil turned inwardly. In the preferred embodiment of the invention as illustrated, the cover is formed relatively snugly around the core, with laterally extending superposed edge portions 26 forming an attaching flange 28. The edge portions are secured together in any suitable fashion, preferably by continuous welding of these portions on a line close to the core, on a line at the edge of the knitted metal mesh fabric, and on a line midway between these welding lines, the several welding lines being indicated by the dash lines 30. Preferably, the flange 28 is corrugated as indicated at 32, the corrugations running transversely to the length of the gasket, as by subjecting it to the action of a crimping machine. This enables the flange to conform better to the shape of the article to be sealed, helps to distribute the wrinkles evenly in the flange, and provides for better clamping action against the flange. The knitted metallic mesh component 14 of the cover protects the foil 18 against tearing and puncturing, being somewhat slidable thereon, while at the same time providing flexibility and resilience in the cover. It will be noted that the edges of the knitted metal mesh need not necessarily extend completely to the outer edge 34 of the flange, as the protection for the foil required in this region is not so critical. Preferably, however, the knitted mesh extends to the edge 34 as illustrated. The foil acts very effectively as both a sealing medium and a fire barrier.

A cover material such as described above, when combined with a resilient, flexible, compressible core, produces a highly satisfactory gasket in accordance with the stated objects. By the proper selection of metals or metallic alloys for the metal mesh components of the core and cover, and for the metallic foil component, the properties of sealability, sealing effectiveness, resilience, flexibility, and heat- and corrosion-resistance can be clearly enhanced, so that the resulting gasket is capable of withstanding extremely high temperatures over a long service life without having its sealing properties materially affected. Preferred corrosion- and heat-resisting metals or metal alloys which may be employed for the several components to produce these results are Inconel, Monel, or stainless steel. Inconel in particular is preferred as being corrosion- and heat-resistant, withstanding temperatures in the neighborhood of 2000° F. and above.

By combining the gasket cover material as described above with a gasket core of the particular type described in said copending application Serial No. 438,997, all of the properties set forth in the statement of objects, including ready compressibility under relatively light sealing forces, good sealing effectiveness over a long service life in extremely high temperature services, high flexibility, and excellent resilience or tendency to recover from compression loads, are obtained.

As explained in said copending application Serial No. 438,997, by forming the gasket center of knitted metal mesh having an initial strand diameter and number of courses per inch within the ranges stated, with the convolutions relatively loosely formed upon each other as described, there results a light and flexible, readily compressible center, having excellent recovery characteristics after compression. The lightness, compressibility, and resilience or recovery characteristics of the center are materially improved by crimping the center strip as described. If the center strip is wrapped more tightly upon itself and so as not to leave a central aperture in the convolute form, an increase in fire-resistance and resilience is obtained, but the construction of the center in this alternative fashion results in the loss of a certain amount of the highly desired ready initial compressibility. The use of a knitted metal mesh jacket on the center as described, and particularly a plurality of such jackets, greatly enhances the resilience of the gasket. These jackets, formed generally of a heavier gauge wire and knitted more coarsely than the center strip, in fact contribute much of the resilience to the gasket, without detracting adversely from its flexibility.

We contemplate as part of our invention that some variations may be made in the cover, from the construction thereof particularly described above. For instance, the knitted metal mesh fabric as an outer layer or layers would provide excellent protection for any thin, flexible, rupturable sheet sealing material other than the foil, and the cover might advantageously in some instances include inwardly of the foil or other rupturable material an additional layer or layers of similar knitted metallic mesh fabric. It is also recognized that a woven or other type of metallic fabric might be employed as the metallic fabric in the cover, with some of the advantages of the knitted metallic mesh fabric, but the latter is definitely superior because of its high flexibility and lack of tendency to rupture or crack upon repeated flexure and the like.

From the foregoing description, it will be apparent that the preferred form of the core itself is open or porous and fluid-pervious; hence, it is important that the thin, flexible fluid-impervious metal foil or like sheet material of the cover, which is relied upon as the sealing medium, be protected against rupture. In the case of the heat resistant metal foil, which also serves as an excellent fire barrier, the protection against rupture is important for that additional reason. As explained above, this protection is provided by the adjacent layer or layers of preferably knitted metal mesh. In the knitted mesh, as is well known, the individual looped strands are free to slide longitudinally on each other, at least to a limited extent. This permits limited, local sliding of the knitted mesh on the foil or other rupturable sheet material, without rupture of the sheet material, while providing excellent flexibility, much superior to that which is provided by a woven mesh, wherein the strands are not free to slide locally upon each other and hence must themselves be bent and subject to early rupture or cracking due to metal fatigue upon flexure.

Having thus described our invention in rather full detail, it will be understood that these details need not be strictly adhered to but that various changes and modifications may suggest themselves to one skilled in the art, all falling within the scope of the invention as defined by the subjoined claims.

What we claim is:

1. A gasket comprising a resilient, flexible, compressible, open or porous, fluid-pervious core, said core having a flexible cover thereon comprising a thin, continuous, rupturable, flexible, fluid-impervious sheet sealing material separate from the core and a separate flexible layer of knitted, open metal mesh outwardly of said sheet sealing material and in contact therewith and free for at least limited sliding movement with respect thereto, and providing protection for said sheet.

2. A gasket as defined in claim 1, in which said knitted metal mesh comprises metal strands, about 7–18 courses per inch, having an initial diameter within the range of about .003–.010 inch.

3. A gasket comprising a resilient, flexible, compressible, open or porous, fluid-pervious core, said core having a flexible cover thereon comprising a thin, continuous, rupturable, flexible, fluid-impervious metal foil sheet sealing material separate from the core and a separate flexible layer of knitted open metal mesh outwardly of said metal foil sheet sealing material and in contact therewith and free for at least limited sliding movement with respect thereto, and providing protection for said sheet.

4. A gasket as defined in claim 3, in which said core comprises high heat resistant metallic components, and in which said foil and said mesh are also highly heat resistant, said foil, said mesh and said metallic components of said core all being capable of withstanding temperatures of the order of 800° F. and up.

5. A gasket as defined in claim 3, in which said foil has a multiplicity of indentations distributed thereover to enhance its flexibility.

6. A gasket as defined in claim 3, in which said cover surrounds said core and has laterally extending superposed edge portions secured together to form a flange, said flange being corrugated.

7. A flexible, compressible, resilient gasket having a core comprising, a knitted mesh of hard, flexible metal strands, about 8–20 courses per inch, said strands having an initial diameter within the range of about .003–.008 inch, said mesh being arranged in convolutions forming a relatively soft, compressible, open or porous, fluid-pervious, resilient center for said gasket, a jacket surrounding said center comprising at least one, outermost layer of knitted mesh of hard, flexible metal strands, about 4–12 courses per inch, having an initial diameter within the range of about .004–.020 inch, and a flexible cover on said core and in contact with said jacket, said cover comprising a separate outer layer of knitted mesh of flexible metal strands, about 7–18 courses per inch, having an initial diameter within the range of about .003–.010 inch, and a flexible, fluid-impervious sheet sealing material inwardly of said outer layer and separate from said outer layer and said jacket, the metal mesh of said jacket being of heavier gauge and more open knit than the metal mesh of said center and the metal mesh of said cover.

8. A gasket as defined in claim 7, in which said sheet sealing material comprises thin, continuous, rupturable, metal foil having a thickness within the range of about .001–.005 inch.

9. A gasket as defined in claim 8, in which said cover surrounds said core and has laterally extending superposed edge portions secured together to form a flange, said flange being corrugated.

10. A gasket as defined in claim 7, in which said mesh of said center is a crimped mesh, whereby the open nature, lightness, compressibility, and resilience of the center, comprising the convolutions of the crimped mesh, are enhanced.

References Cited in the file of this patent

UNITED STATES PATENTS

| | | |
|---|---|---|
| 2,080,166 | Crowe | May 11, 1937 |
| 2,250,863 | Goodloe | July 29, 1941 |
| 2,274,189 | Congleton | Feb. 24, 1942 |
| 2,329,994 | Kingman | Sept. 21, 1943 |
| 2,376,039 | Driscoll et al. | May 15, 1945 |

FOREIGN PATENTS

| | | |
|---|---|---|
| 145,186 | Great Britain | July 2, 1920 |